(12) United States Patent
Schrey et al.

(10) Patent No.: US 8,326,474 B2
(45) Date of Patent: Dec. 4, 2012

(54) METHOD FOR OPERATING A NAVIGATION SYSTEM AND NAVIGATION SYSTEM FOR A MOTOR VEHICLE

(75) Inventors: Rolf Schrey, Monchengladbach (DE); Bruno Bozionek, Borchen (DE); Rainer Zimmermann, Paderborn (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 246 days.

(21) Appl. No.: 12/602,302

(22) PCT Filed: Apr. 24, 2008

(86) PCT No.: PCT/EP2008/054980
§ 371 (c)(1), (2), (4) Date: Apr. 13, 2010

(87) PCT Pub. No.: WO2008/148606
PCT Pub. Date: Dec. 11, 2008

(65) Prior Publication Data
US 2010/0274422 A1 Oct. 28, 2010

(30) Foreign Application Priority Data
Jun. 6, 2007 (DE) .......................... 10 2007 026 320

(51) Int. Cl.
*B60L 11/00* (2006.01)
(52) U.S. Cl. ................ 701/22; 701/23; 701/24; 701/25; 701/26; 701/56; 44/407; 44/412; 44/419; 44/449; 568/697; 568/699; 903/903; 903/916; 903/946; 318/587
(58) Field of Classification Search .......... 701/22, 701/23, 24, 25, 26, 56, 123, 200, 408; 44/3, 44/1 A, 407, 412, 419, 449; 568/697, 699; 903/903, 916, 946; 252/392; 318/587; 180/65.23; 103/244
See application file for complete search history.

(56) References Cited

U.S. PATENT DOCUMENTS
5,815,824 A 9/1998 Saga et al.
(Continued)

FOREIGN PATENT DOCUMENTS
DE 10104499 A1 8/2002
(Continued)

OTHER PUBLICATIONS
International Preliminary Report on Patentability for PCT/EP2008/054980 (Form PCT/IB/373 and PCT/ISA/237) (German).
(Continued)

*Primary Examiner* — James Trammell
*Assistant Examiner* — McDieunel Marc
(74) *Attorney, Agent, or Firm* — Buchanan Ingersoll & Rooney PC

(57) ABSTRACT

We provide a method for operating a navigation system for a motor vehicle in a road network, and to a navigation system. To this end, first a zone of the road network is provided with an emissions class-dependent drive-through restriction, wherein the motor vehicle is associated with at least one emissions class. First, information about the geographical location of the zone and about the emissions class at least required there is stored in the navigation system. Then, information about the at least one emissions class of the motor vehicle is entered into the navigation system. Thereafter, the information entered is considered in the destination guidance process, wherein destination guidance into or through the zone is avoided if the at least one emissions class of the motor vehicle is affected by emissions class-dependent drive-through restrictions in the zone.

13 Claims, 2 Drawing Sheets

U.S. PATENT DOCUMENTS

| | | | |
|---|---|---|---|
| 5,892,346 A * | 4/1999 | Moroto et al. | 318/587 |
| 5,951,722 A * | 9/1999 | Sanders et al. | 44/354 |
| 6,038,505 A * | 3/2000 | Probst et al. | 701/65 |
| 6,094,618 A * | 7/2000 | Harada | 701/36 |
| 6,422,191 B1 * | 7/2002 | Braun et al. | 123/184.21 |
| 6,807,482 B2 | 10/2004 | Utsumi | |
| 6,816,761 B2 | 11/2004 | Denton | |
| 6,862,524 B1 | 3/2005 | Nagda et al. | |
| 6,947,839 B2 | 9/2005 | Uotani | |
| 7,251,560 B2 | 7/2007 | Ogasawara et al. | |
| 7,349,797 B2 * | 3/2008 | Donnelly et al. | 701/115 |
| 7,857,071 B1 * | 12/2010 | McCain et al. | 172/4.5 |
| 7,925,433 B2 * | 4/2011 | Smith et al. | 705/7.25 |
| 8,145,390 B2 * | 3/2012 | Dix et al. | 701/50 |
| 2005/0251299 A1 * | 11/2005 | Donnelly et al. | 701/19 |

FOREIGN PATENT DOCUMENTS

| | | |
|---|---|---|
| DE | 102005047333 A1 | 2/2006 |
| EP | 1211630 A2 | 6/2002 |
| EP | 1297982 A2 | 4/2003 |
| JP | 2004153929 A | 5/2004 |
| JP | 2005345360 A | 12/2005 |
| JP | 2007033331 A | 2/2007 |
| JP | 2007079631 A | 3/2007 |
| RU | 2207262 C1 | 6/2003 |
| RU | 2288509 C1 | 11/2006 |
| WO | 97/11440 A2 | 3/1997 |
| WO | 2006043419 A1 | 4/2006 |

OTHER PUBLICATIONS

International Preliminary Report on Patentability for PCT/EP2008/054980 (Form PCT/IB/373 and PCT/ISA/237) (English Translation).

International Search Report dated Aug. 28, 2008 for PCT/EP2008/054980 (PCT/ISA/210).

* cited by examiner

METHOD FOR OPERATING A NAVIGATION SYSTEM AND NAVIGATION SYSTEM FOR A MOTOR VEHICLE

CROSS-REFERENCE TO RELATED APPLICATIONS

This application is the United States national phase under 35 U.S.C. 371 of International Patent Application No. PCT/EP2008/054980 filed on Apr. 24, 2008 and claiming priority to German Application No. 10 2007 026 320.3 filed on Jun. 6, 2007.

BACKGROUND OF THE INVENTION

1. Field of the Invention

The invention relates to a method for operating a navigation system for a motor vehicle and a navigation system for a motor vehicle.

2. Background of the Art

Operating motor vehicles with combustion engines is associated with emissions, which particularly in the case of higher concentrations (e.g., of harmful substances in respiratory air) may have adverse effects on humans, animals and the environment. For this reason, motor vehicles are equipped with technical devices to reduce emissions (e.g., exhaust gases, particulate matter and noise). Nevertheless, precisely in congested urban areas, the legal limits for air pollution are exceeded regularly, above all with respect to contamination from particulate matter, so that increasingly so-called "low-emission zones" are being designated, where only motor vehicles with particularly low emissions may drive. For this purpose, most motor vehicles are currently classified into four groups (emissions classes), and a traffic sign on the outskirts of this type of "low-emission zone" provides information about which motor vehicles may or may not enter the zone based on its emissions class.

For monitoring and enforcement, motor vehicles are identified with different colored stickers indicating the emissions class assigned to the respective motor vehicle.

The goal of this method is banning those motor vehicles that contribute substantially to air pollution from operating in these types of zones and areas of the road network (street network), which are located in zones (low-emission zones) subject to a high level of pollution from emissions.

What has proven to be disadvantageous in the described method is that road users unfamiliar with the local area are not acquainted with the exact geographic location of the low-emission zones and therefore inadvertently and illegally drive into these types of low-emission zones with their motor vehicles, even though the respective motor vehicle does not possess the emissions class required to do so. A further disadvantage is that some motor vehicles, such as hybrid vehicles, have differentiated emission characteristics depending on the operating mode, which cannot be meaningfully represented by the rigid assignment of a motor vehicle to a single emissions class.

It would be desirable to support drivers of motor vehicles in observing the drive-through restrictions resulting from the low-emission zones and emissions classes of their motor vehicles. At the same time, it would be desirable to integrate motor vehicles with different operating modes into the plan for low-emission zones.

BRIEF SUMMARY OF THE INVENTION

Embodiments of the invention provide a method of operating a navigation system for a motor vehicle in a road network, wherein at least one zone of the road network is provided with an emissions class-dependent drive-through restriction, and wherein the motor vehicle is associated with at least one emissions class. In this case, information about the geographic location of the one or more zones and about the minimum emissions class(es) required for motor vehicles to be authorized to drive through this zone is initially stored in a database of the navigation system, and information about the one or more emissions classes of the motor vehicle is furthermore entered with the navigation system into this or another database of the navigation system.

The information entered is taken into consideration for the destination guidance process, wherein the destination guidance into or through the zone is avoided, if the one or more emissions classes of the motor vehicle are affected by emissions class-dependent drive-through restrictions in the zone. The motor vehicle is navigated by this method in such a way that the drive-through restrictions (drive-through bans; blocks) of the zone (low-emission zone) are observed, wherein the navigation system guarantees observance of the legal provisions by comparing the emissions class of the motor vehicle used with the "permissible" and/or "blocked" emissions classes for the zone. The term "emissions class" in this case generally designates a condition or a limit value for an emission, wherein, for most emission types (e.g., for various harmful gaseous substances, noise emissions, but also actual vehicle weight, etc.), they can either be merged into a combined emissions class or be considered as individual emissions classes depending on their respective limit values. In the latter case, destination guidance is then advantageously avoided in the low-emission zone, if at least one of the (current) emissions classes or one of the emissions values of the motor vehicle is incompatible with the drive-through restriction. The information about the emissions class of the motor vehicle to be entered for the second step can be transmitted to the navigation system or entered into it in different ways, wherein an especially simple way is entering this information manually into the navigation system. A convenient alternative results from the emissions class preferably being transmitted electronically to the navigation system via a vehicle-side data bus from an information memory in the motor vehicle (e.g., motor management system or vehicle management system). It is particularly advantageous for mobile navigation devices if this information is transmitted wirelessly to the navigation system by an information memory connected to the vehicle.

An RFID transponder can be advantageously used for this purpose, with said transponder being integrated into the emissions sticker issued to the motor vehicle by the authorities. Such a sticker (for the most part identified by color) is also equipped with information about the emissions class of the motor vehicle, so that wireless transmission of information can be provided along with the visual effect of the sticker. Of course, a further radio connection (for example according to Bluetooth Standard IEEE 802.15.1) or optical scanning, e.g., by means of a barcode reader assigned to the navigation device and a corresponding imprint on the sticker, is also possible.

Attaining this objective furthermore provides for a navigation system for a motor vehicle, which is equipped with a database for a road network. The database of the navigation system in this case is configured for storing at least one emission class-dependent drive-through restriction for at least one zone of the road network, wherein the navigation system is furthermore set up for storing at least one emissions class assigned to the motor vehicle for which the navigation system is being operated. The navigation system is configured to take into consideration the emissions class-dependent drive-through restrictions for the zone with respect to the one or more emissions classes assigned to the motor vehicle, wherein driving into and/or through the zone is avoided if the one or more emissions classes of the motor vehicle are affected by the drive-through restriction. Such a navigation system guarantees that the emissions classes corresponding to the drive-through restriction, and therefore the vehicles assigned to said emissions classes, do not drive into the zone (low-emission zone), thereby making it easier for the driver of the motor vehicle to comply with the legal provisions.

Further developments of the invented method are disclosed in the subordinate patent claims. The features used in this case and their advantages are applicable analogously to the invented navigation system.

In cases in which the travel destination lies inside the zone, and the motor vehicle may not drive through the zone due to the emissions class required there, destination guidance to a parking area (e.g., park-and-ride parking area, bus station, etc.) outside the zone may be carried out advantageously, wherein the closest possible navigation to the desired destination or an alternative destination advantageously takes place. Such an alternative destination may be selected by the navigation system on the basis of travel times (road map) and costs in the local public transportation system, for example. In cases in which a direct route to the travel destination passes through a zone which may not be driven through due to the one or more emissions classes assigned to the motor vehicle, a driving route avoiding this zone will be calculated advantageously by the navigation system, and said route will be used for the destination guidance. This also prevents improper entry into a zone (low-emission zone) that is prohibited for that particular motor vehicle.

Improved control of the flow of traffic may be achieved in cases where different emissions classes apply to the zone at different times as a criterion for the drive-through restriction, wherein in the third step, the emissions class-related drive-through restrictions applicable at the respective travel time are taken into consideration. Provided this time-related constraint is established in advance or corresponds to a fixed time grid, the information entered in the first step is provided with a time-of-day constraint and/or a day-of-the-week constraint or other time information, wherein in the third step, the information about the respective emissions class to be used for the drive-through restriction applicable to the respective time of day and/or the respective day of the week is taken into consideration.

Aside from this time-related control, the required emissions class (minimum emissions class) may also be determined "dynamically," for example controlled by regular or continuous measurement of the actual (current) pollution in the zone. In this case, information about the emissions class-dependent drive-through restriction applicable at the respective time and/or information about a change of same is advantageously communicated to the navigation system via a radio-based service and is stored in a database by said navigation system and taken into consideration for the destination guidance. To this end, a similar or the same radio method as for the traffic news (TMC=traffic message channel) may be used.

The method may be used advantageously for operation with motor vehicles that are set up for operating in at least two different operating modes, wherein a (separate) emissions class is assigned to each operating mode. To this end, when operating the motor vehicle in a zone having an emissions class-dependent drive-through restriction controlled by the navigation system, an operating mode is selected whose assigned emissions class provides for operation conforming with the drive-through restriction. This method may be used advantageously in particular if the motor vehicle is a hybrid vehicle with a first operating mode for operation with a combustion engine and a second operating mode for operation with an electric motor. In this case, when the motor vehicle enters the zone whose emissions class-dependent drive-through restriction does not permit the operation of the motor vehicle in the first operating mode, a control command is issued by the navigation system for the drive technology of the motor vehicle to switch over to the second operating mode. The use of the first operating mode is then advantageously blocked until the motor vehicle drives out of the zone; in this case, an "emergency switch" can also be used advantageously, which makes the exceptional use of the combustion engine possible even inside the zone. Because of this method, it is possible for the motor vehicle to operate outside of the zone using the combustion engine, thereby charging the batteries or accumulators in those areas of the road network in which operation of the combustion engine is possible or permissible. On the other hand, especially sensitive areas, e.g., low-emission zones with heavy restrictions (zero-emission zones) like spa areas, parking areas and routes on the grounds of hospitals, underground parking, pedestrian zones, etc., are kept almost completely free of emissions caused by motor vehicles.

It is also advantageously possible to take several types of emissions into account, such that, e.g., high engine rpms, which are associated with high noise emissions, can be avoided automatically in zones that are sensitive to noise. Acoustic warning devices (buzzers, horns, sirens) can also be correspondingly automatically dampened in these types of zones, because the audibility of these types of acoustic devices in low-noise zones is assured even at a reduced volume.

Exemplary embodiments of the invented method will be explained in the following and on the basis of the drawings. Said drawings simultaneously serve to explain an exemplary embodiment of an inventive navigation system.

DETAILED DESCRIPTION OF THE INVENTION

Figure 1:
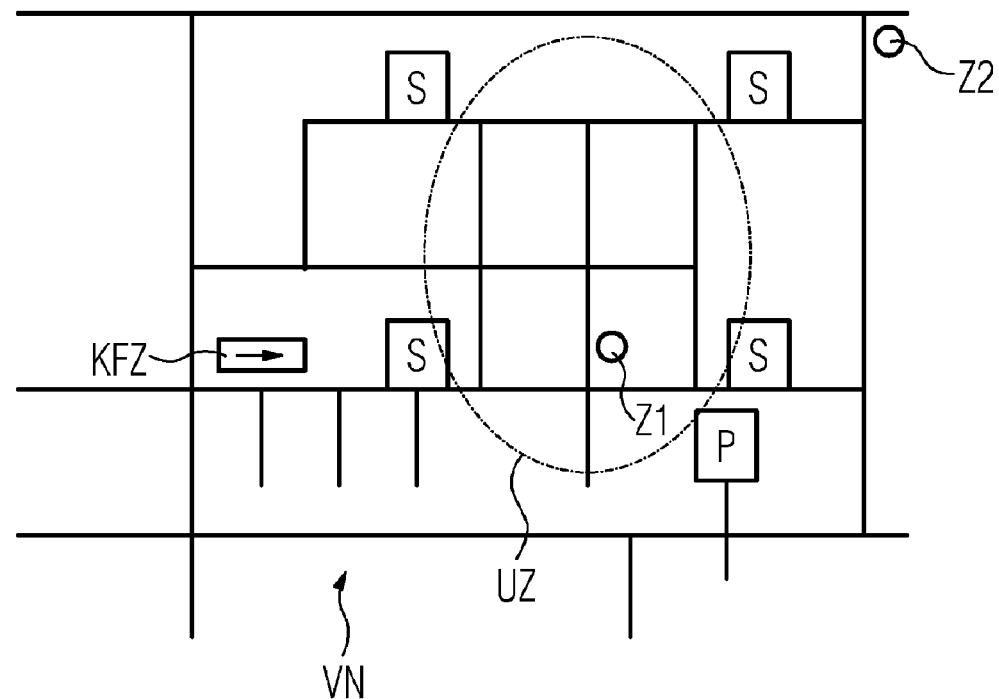
FIG. 1 Schematic depiction of a road network with streets, a motor vehicle, a parking area, four traffic signs and two destinations, FIG. 2 A traffic sign for a low-emission zone, and FIG. 3 A schematic depiction of a motor vehicle with a navigation system, a motor management system and three satellites of a satellite navigation system.

FIG. 1 depicts a road network VN with a low-emission zone UZ as a zone. A motor vehicle KFZ is driving in the road network VN; the motor vehicle KFZ is depicted schematically in FIG. 3. A parking area P and destinations Z1, Z2 are accessible via the road network VN. In this case, destination Z1 is located inside and destination Z2 is located outside of the low-emission zone UZ. In a real road network VN, the low-emission zone UZ is identified by traffic sign S; such a traffic sign S is depicted in FIG. 2.

Figure 2:
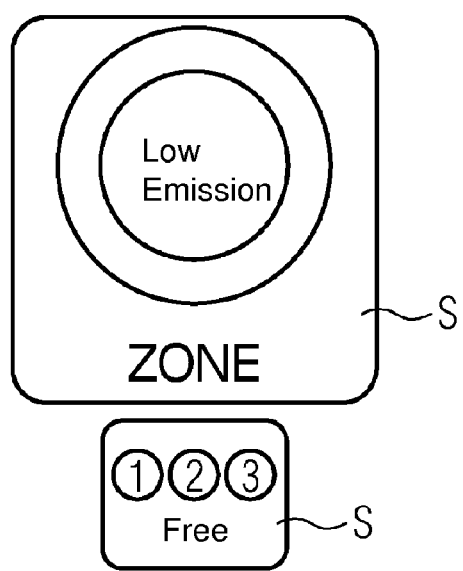

As mentioned, FIG. 2 shows an example of a traffic sign S, wherein this traffic sign S makes road users aware of the fact this at this location driving through is restricted for all motor vehicles that do not have specific emissions classes. In the present exemplary embodiment, all motor vehicles assigned to emissions classes 1, 2 or 3 may drive through the zone.

Figure 3:
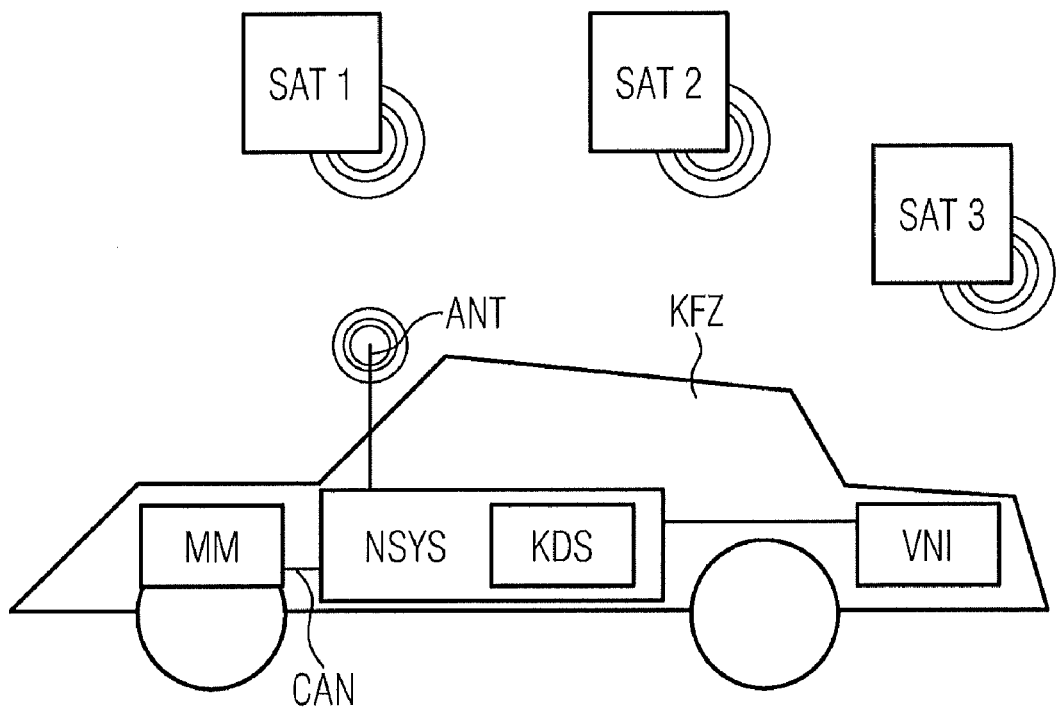

FIG. 3 shows a schematic representation of a motor vehicle KFZ, which is equipped with a navigation system NSYS and a motor management system MM. The navigation system NSYS and the motor management system MM are linked to each other via a data bus CAN. The navigation system NSYS is connected to a satellite receiver antenna ANT for detecting signals from navigation satellites SAT1, SAT2, SAT3. Moreover, the navigation system NSYS has a configuration data memory KDS (customer data memory) and is connected via a data cable to a data memory VNI (road network information), which comprises the database (map data) for the road network VN. Instead of the separate solution depicted here, the database with the street data for the road network (road network VN) can also be integrated into the navigation system NSYS.

The following will describe, as an exemplary embodiment, a navigation system-supported journey of the motor vehicle KFZ to the destination Z1, wherein at the beginning of the journey the motor vehicle KFZ is located outside the low-emission zone UZ, while destination Z1 is located inside the low-emission zone UZ. The motor vehicle KFZ is assigned to emissions class "0"; this value was entered into the database KDS when the navigation system NSYS was installed. Alternatively, this information about the emissions class can also be read out from the motor management system MM on a one-time or recurring basis via the data bus CAN.

In a further embodiment, the navigation system NSYS is designed as a mobile device. In this case, along with the already described manual entry by a user of the motor vehicle, information about the emissions class can also be read out from an information memory other than the motor management system MM, e.g., wirelessly from the RFID transponder connected to the motor vehicle, which in this exemplary embodiment is included as a so-called "emissions sticker," which was issued to the motor vehicle KFZ by the motor vehicle licensing authorities and was affixed to said vehicle (for example in the area of the windshield). In a further alternative embodiment, this sticker can also be provided with a machine-readable label, e.g., a barcode, which is optically detected by the navigation system NSYS.

The data memory VNI in this exemplary embodiment is stored on a re-writeable memory card, which is connected to the navigation system NSYS; of course, other storage media are also conceivable, such as DVD (digital versatile disc). In an alternative embodiment, the navigation system NSYS may also wirelessly access this type of road data, which are stored at a central location, e.g., via a GSM mobile wireless connection.

Information about the geographic location of the low-emission zone UZ or about those streets or sections of streets that are a part of the low-emission zone UZ is also included in the data memory VNI (electronic road map). In the present exemplary embodiment, information about the low-emission zone UZ is supplied by the manufacturer and integrated into the "electronic road map," i.e., into the data memory VNI. However, as an alternative, this information can also be stored separately in another data memory of the navigation system NSYS. This applies in particular to those types of exemplary embodiments, in which the geographic location of the low-emission zone UZ and/or the emissions classes that are "permitted" or "prohibited" there are "dynamic," i.e., subject to a time-related change. To this end, information about the low-emission zone UZ may also be imported regularly or as needed into the navigation system NSYS via a digital traffic message channel (TMC) or another wireless connection. Information about the low-emission zone UZ may also be linked with time-related conditions, e.g., in such a way that emissions classes 1, 2 and 3 may drive in the low-emission zone UZ on weekends, while on weekdays for example only motor vehicles KFZ with emissions class 3 (or higher) may operate in the low-emission zone UZ.

It is assumed in the following that the motor vehicle KFZ has emissions class "0," which means that the depicted low-emission zone UZ may not be entered, because only motor vehicles with the higher-order emissions classes 1, 2 or 3 (or above) may be operated there. When planning the route to the desired travel destination Z1, the navigation system NSYS establishes that emissions class "0" does not suffice to reach the destination directly, so the parking area P nearest to the travel destination Z1 is selected as the alternative destination. The travel route to the parking area P is selected in this case such that driving into or through the low-emission zone UZ is avoided. If the driver of the motor vehicle KFZ is not using the navigation system NSYS for guidance to his destination, in the event of an attempt to drive into the low-emission zone UZ, the navigation system NSYS notifies the driver that he is on the verge of violating the drive-through restriction of the low-emission zone UZ. Optionally, the system provides a recommendation for favorably continuing the journey with public transportation and a suitable parking area.

In another similarly structured exemplary embodiment, the travel destination Z2 is now located outside the low-emission zone UZ, but the most convenient travel route from the current location of the motor vehicle KFZ to the travel destination Z2 goes through the low-emission zone UZ. However, during the route planning, the navigation system NSYS will take the drive-through restriction into consideration, so that the driver of the motor vehicle KFZ will be provided with alternative destination guidance that circumvents the low-emission zone UZ so that the drive-through restriction is obeyed.

In an alternative exemplary embodiment, it is assumed that the motor vehicle KFZ is a hybrid vehicle, which meets emissions class "3" in an operating mode with the combustion engine switched on, whereas in the purely electric operating mode an emissions class "Z" (zero) is achieved, which means that no gaseous emissions are being expelled. Moreover, it is assumed for this exemplary embodiment that only motor vehicles of emissions class "4" (or above) may drive in the low-emission zone UZ. When reading out the vehicle management system of the motor vehicle KFZ, the navigation system NSYS is provided with information that it is a hybrid vehicle having the operating mode-dependent emissions classes "3" and "Z". In an interactive user dialog, the navigation system NSYS is further provided with information about what the range of the motor vehicle KFZ is in the purely electric operating mode; as an alternative, this information can also be dispensed automatically from a vehicle management system of the motor vehicle KFZ.

In calculating the route for the motor vehicle KFZ to the travel destination Z1, the navigation system NSYS now takes this information into consideration, whereby it establishes that the low-emission zone UZ may only be driven through in the electric operating mode, because, in the operating mode with a combustion engine, the motor vehicle KFZ possesses emissions class "3" which is affected by the drive-through restriction. In addition, the navigation system NSYS establishes that the range of the accumulators of the electric drive suffices for reaching the travel destination Z1 and returning to the road network outside the low-emission zone UZ. The navigation system NSYS informs the user (motor vehicle driver) of this fact, and upon reaching the low-emission zone UZ issues a control command to the vehicle management system, which initiates a switch-over to the purely electric operating mode. The associated "block" of the combustion drive by a corresponding command from the navigation system NSYS is rescinded as soon as the motor vehicle KFZ exits the low-emission zone UZ again.

Instead of a "hard" switch-over to an electric operating mode, depending upon the required emission limit value, a reduction in the engine output of the combustion engine, a reduction in rpms or a further technical measure can be initiated automatically in order to reduce the actual (current) emissions.

The invention claimed is:

1. A method for operating a navigation system for a motor vehicle in a road network, wherein at least one zone of the road network is provided with an emissions class-dependent drive-through restriction, wherein the motor vehicle is associated with at least one emissions class, comprising:
   - in a first step storing in a first database of the navigation system, information about the geographic location of the one or more zones and about the minimum emissions class that is required in the zones for the motor vehicle to be authorized to drive through,
   - in a second step, entering information about the one or more emissions classes of the motor vehicle with the navigation system in a second database of the navigation system, and
   - in a third step, considering the information entered in the first and second steps in the destination guidance process, wherein destination guidance into or through the zone is avoided, if the one or more emissions classes of the motor vehicle are affected by emissions class-dependent drive-through restrictions in the zone, wherein in the second step, the emissions class is transmitted from a motor-vehicle-side information memory to the navigation system, wherein a mobile navigation system is used as the navigation system and information about the one or more emissions classes is read out via wireless contact by the navigation system from a vehicle-side information memory.

2. The method of claim 1, wherein in the second step, the emissions class of the motor vehicle is entered manually into the navigation system.

3. The method of claim 1, wherein the one or more emissions classes assigned to the motor vehicle are stored in a motor management system or vehicle management system of the motor vehicle and transmitted to the navigation system via a motor-vehicle-side data bus.

4. The method of claim 1, wherein a sticker provided with a transponder system is used as the vehicle-side information memory, from which information about the one or more emissions classes is read out via wireless contact.

5. The method of claim 1, further comprising, in the cases in which a travel destination lies inside the zone and the motor vehicle may not drive through the zone due to the emissions class required there, providing destination guidance to a parking area outside the zone.

6. The method of claim 1, further comprising in the cases in which a direct route to a travel destination passes through a zone, and that zone may not be driven through due to the one or more emissions classes assigned to the motor vehicle, calculating a driving route avoiding this zone by the navigation system and using said route for destination guidance.

7. The method of claim 1, comprising considering an emissions class-dependent drive-through restriction at a specific travel time, wherein different emissions classes apply to the zone at different times as a criterion for the drive-through restriction.

8. The method of claim 7, wherein at least one of information about the emissions class-dependent drive-through restriction applicable at the respective time and information about a change of same is communicated to the navigation system via a radio-based service and is stored in the database by said navigation system and taken into consideration for destination guidance.

9. The method of claim 1, wherein the motor vehicle is set up for operating in at least two different operating modes, wherein an emissions class is assigned to each operating mode and wherein when operating the motor vehicle in a zone having an emissions class-dependent drive-through restriction, an operating mode is selected whose assigned emissions class provides for operation conforming with the drive-through restriction.

10. The method of claim 9, wherein hybrid vehicle with a first operating mode for operation with a combustion engine and a second operating mode for operation with an electric motor is provided as the motor vehicle, wherein, when the motor vehicle enters a zone whose emissions class-dependent drive-through restriction does not provide for operation of the motor vehicle in the first operating mode, a control command is issued by the navigation system for the drive technology of the motor vehicle to switch over to the second operating mode.

11. The method of claim 10, wherein the use of the first operating mode is blocked until the motor vehicle drives out of the zone.

12. The method of claim 1, wherein the information entered in the first step is provided with at least one of a time-of-day constraint and a day-of-the-week constraint, wherein in the third step, at least one of information about the emissions class to be used for the drive-through restriction applicable to the respective time-of-day and information about the respective day-of-the-week is taken into consideration.

13. Navigation system for a motor vehicle, comprising a database for a road network, wherein the navigation system is configured for storing at least one emissions class-dependent drive-through restriction for at least one zone of the road network, the navigation system is set up for storing at least one emissions class assigned to the motor vehicle in which the navigation system is being operated, and the navigation system is configured for taking into consideration the emissions class-dependent drive-through restriction for the zone with respect to the one or more emissions classes assigned to the motor vehicle, wherein driving into and/or through the zone is avoided in the cases in which the one or more emissions classes of the motor vehicle are affected by the drive-through restriction, characterized in that the navigation system is configured for reading out the emissions class via wireless contact from a motor-vehicle-side information memory.

* * * * *